July 22, 1924.
C. G. ANDERSON
RIM ATTACHING TABLE
Filed March 4, 1920
1,501,980
2 Sheets—Sheet 1
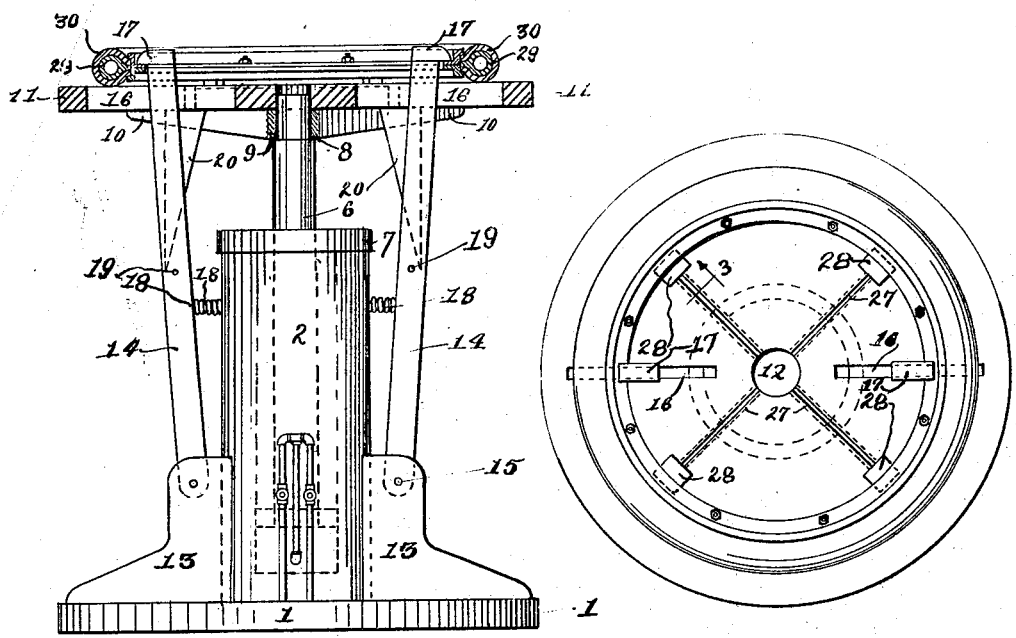
Fig. 1
Fig. 2
Fig. 3
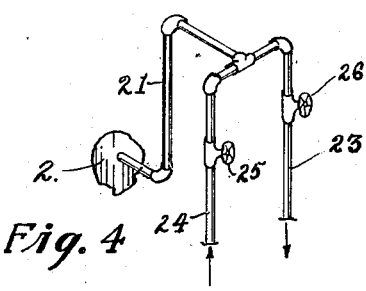
Fig. 4
Carl G. Anderson
INVENTOR.
BY F. E. Shannon
ATTORNEY.

July 22, 1924.
C. G. ANDERSON
1,501,980
RIM ATTACHING TABLE
Filed March 4, 1920    2 Sheets-Sheet 2
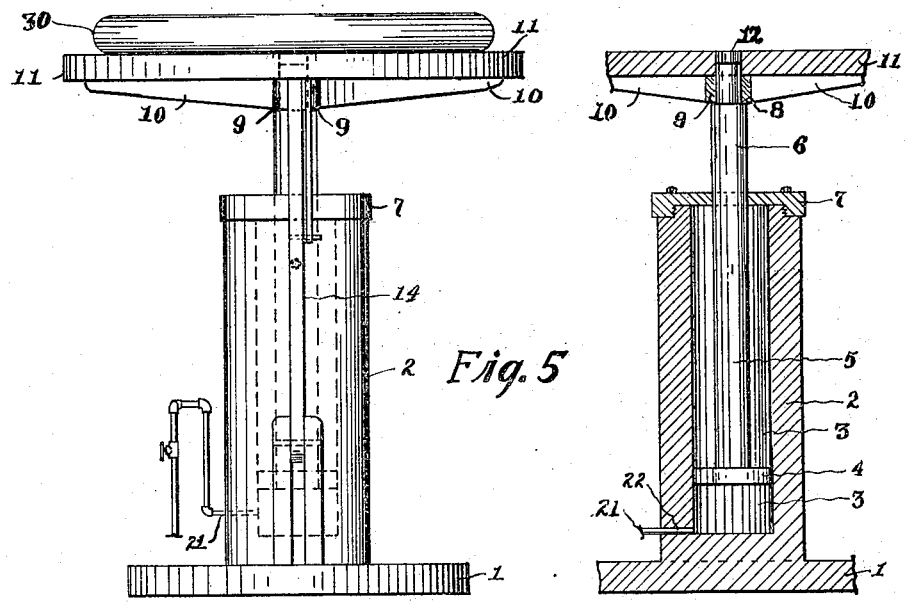
Fig. 5
Fig. 7
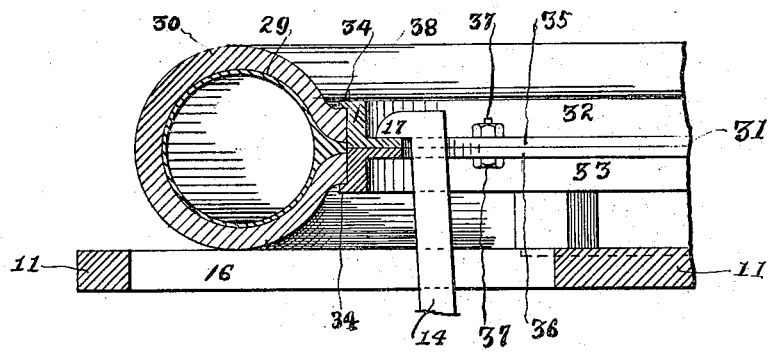
Fig. 6
Carl G. Anderson
INVENTOR.
BY
ATTORNEY.

Patented July 22, 1924.

1,501,980

UNITED STATES PATENT OFFICE.

CARL G. ANDERSON, OF AKRON, OHIO.

RIM-ATTACHING TABLE.

Application filed March 4, 1920. Serial No. 363,186.

*To all whom it may concern:*

Be it known that I, CARL G. ANDERSON, a citizen of the United States, residing at Akron, in the county of Summit and State of Ohio, have invented new and useful Improvements in Rim-Attaching Tables, of which the following is a specification.

This invention relates to improvements in pneumatic tire manufacturing machinery and has particular relation to a device designed to facilitate the insertion of air bags in pneumatic tires.

In the manufacture of pneumatic tires and particularly cord tire casings, the body of the tire is first constructed, an air bag is placed within the casing and the casing is positioned within the cavity of a mold and expanded by means of fluid pressure during vulcanization. An essential part of said molds consists in a pair of complemental bead rings which are clamped about the inner circumferential edges of the tire to hold the same in place during vulcanization. In carrying out the above described process, the air bag is first positioned within the tire and the mold rings are positioned on opposite sides thereof and are bolted together. Obviously it is very difficult to force the mold rings together and bolt the same in place with the bead edges of a tire positioned therebetween.

One of the particular objects of the invention is the provision of a device whereby said rings may be easily forced together and held in place while being bolted together.

An important object is to provide a new and improved device of this general character whereby such rings may be secured to a tire without pinching or otherwise injuring the air bag.

A further object is to provide a device of the class above described which may be used to more quickly and economically secure said rims to such tire.

In general, the object of the invention is to provide a simple, strong, durable device whereby the above objects may be attained and which will be less expensive, more convenient and otherwise more advantageous in use than any device of a similar character heretofore known.

I accomplished the above and additional objects by the novel construction, combination and arrangement of parts herein fully described and illustrated in the accompanying drawings which form a part hereof and in which I have illustrated a preferred embodiment of the invention, it being understood that the invention is capable of various adaptations and that changes and modifications may be resorted to which come within the spirit of the invention or the scope of the claims hereunto appended.

In the drawings in which like numerals of reference are employed to designate corresponding parts throughout the several views, Figure 1 is a side view of a device constructed in accordance with this invention having portions shown in cross section and illustrating the manner in which a tire and mold rim is positioned thereon.

Figure 2 is a plan view of same.

Figure 3 is a cross sectional view of a portion of the device taken approximately on line 3 of Figure 2.

Figure 4 is a perspective view of the pipes and valves employed in carrying out the invention.

Figure 5 is an end elevation of the device shown in Figure 1.

Figure 6 is a cross sectional view of a portion of the device also illustrating the manner in which a tire is positioned thereon and the manner in which a rim is secured to said tire.

Figure 7 is a cross sectional view of the cylindrical portion of the device also showing the piston employed in the carrying out of the invention.

Referring now to the drawings specifically, the numeral 1 is used to denote a suitable base and the numeral 2, a cylindrical body, extending upwardly therefrom. The cylindrical body 2 is provided with a vertical bore 3 in which is slidably mounted a piston head 4 which is attached to the lower end of the cylindrical shaft 6. The upper end of the bore 3 is closed by means of a cap 7 which is provided with a vertical bore adapted to receive the shaft 6 which extends upwardly therethrough and is adapted to slide vertically therein. The shaft 6 is reduced in diameter adjacent its upper end to provide an offset 8 on which is mounted, a spider, comprising a collar 9 which is provided with a plurality of horizontal radially extending arms 10. The reduced outer end of the shaft 6 extends upwardly from the upper face of the collar 9 and a circular table 11 is detachably mounted upon the arms 10. The table 11 has a centrally positioned vertical bore 12 which is adapted to fit over the upwardly extending end of the shaft 7 which holds the table in a central position on the said arms. Extending upwardly from the base 1 and outwardly from the cylinder 2 and from opposite sides thereof, are the wings 13. Each of the wings 13 is provided in the upper face thereof with a centrally positioned slot in which the upright arms 14 are rotatably secured by the pins 15 which extend horizontally through the upper portion of each wing 13 so that the upper end of the arms 14 may be moved in a vertical plane to and from said cylinder. The table 11 is provided with two radially directed slots or openings 16 which are positioned in said table on opposite sides of the opening 12. Each of the arms 14 extend upwardly through one of these slots 16 and projects therebeyond, and each arm 14 is provided on its upper end with outwardly extending rim engaging claws 17, the purpose of which will be hereinafter described.

The upper ends of the arms 14 are normally forced outwardly by the action of the springs 18, one of which is mounted between each arm 14 and the cylinder 2. Each arm 14 is provided approximately central of its length with a pin which is adapted to slide on the inward extending edge of the wedge-shaped member 20. The member 20 is formed in the shape of a right angle triangle, having a relatively narrow base secured to the arms 10 against the under face of the table 11. Each of the wedge-shaped members 20 extend downwardly from one of the arms 10 and has an inner face which slopes downwardly and outwardly from said arm 10, so that the lower points of the wedges 20 are approximately in a line with the pins 19 when the device is in its operative position as shown in Figure 1.

The cylinder 2 is provided with a relatively small bore 22 which extends horizontally through the wall of the cylinder 2 to the bore 3 at a point adjacent the base 1 and a suitable pipe 21 is operatively connected thereto. The pipe 21 is provided at its outwardly extending end with a T-coupling 24, one end of which is operatively connected to the pipe 23 and the other end of which is operatively connected to the pipe 24. The pipe 24 is provided with a valve 25 and the pipe 23 is provided with a valve 26. The pipe 24 is designed to carry liquid under pressure and in operation is connected to a tank or pump or other means to supply liquid pressure. The pipe 23 is an exhaust pipe and is designed to permit the air or other liquid under pressure to escape from the cylindrical bore 3 when desired.

The table 11 is also provided with grooves 27, preferably of dovetail cross section which extend outwardly and radially from the centrally positioned bore 12. The block 28 has a downwardly projecting rib of dovetail cross section which is adapted to slidably secure the block 28 in the groove 27. The outer end of the shaft terminates at a point below the bottom of the groove 27 in the table 11 and provides an open end to said slot 27 into which the block 28 may be placed to enter it therein. The numeral 29 indicates an air bag such as is ordinarily used in the manufacture of pneumatic tire casings and particularly those composed of cords or threads and rubber. The numeral 30 indicates a tire casing and the numeral 31 is used generally to denote a mold rim. The rim 31 comprises an annulus which is split longitudinally along its center into two annular rings 32 and 33. Each of these rings is provided on its outer lateral side with a circumferentially extending flange 34 which projects outwardly and radially therefrom at approximately a right angle to the peripheral face of the ring. The rings 32 and 33 are adapted to abut and are provided on the abutting edges with a radially directed, circumferentially extending flange 34. The numeral 35 is used to denote an inwardly directed radial flange on the ring 32 and the numeral 36 is used to denote a similar flange on the ring 33. The two flanges 35 and 36, when placed in lateral abutment, form the rim flange 31. The flanges 35 and 36 are each provided with a plurality of laterally directed bolt-receiving apertures which are adapted to coincide and receive the bolts 37. The bolts 37 are adapted to hold said rings in lateral abutment in the form of an annulus which is provided with a flat peripheral seat 38, designed to receive the base of the tire shoe 30, the same being held in position thereon by the flanges 34.

In use, the valve 25 is closed and the valve 26 is opened which permits the air or other fluid in the bore 3 to issue from the pipe 23. The weight on the shaft 5 forces the piston head 4 to a position adjacent the bottom of the bore 3. As the piston head 4 travels downwardly, the inclined face of the wedge-shaped members 20 engage the pins 19 on the arms 14 and force the arms inwardly to the inwardly extending edges of the slots 16. The blocks 28 are moved outwardly in the proper position and the ring 33 is placed thereon. The air bag 29 is placed in the tire casing 30 and the tire casing is placed over the ring 33. The ring 32 is then placed above the ring 33 with the flange 34 in contact with the inner lateral edge of the base of the tire 30. The valve 26 is then closed and the valve 25 is opened, which permits compressed air or other fluid, under pressure, to enter the bore 3 of the cylinder 2 at a point below the piston 4. The piston is then forced upwardly in the cylinder 2 and, as the wedge shaped members 20 are carried upwardly, the upward movement of the inclined inner edges thereof permit the arms 14 to be forced outwardly by the springs 18, until the claw 17 engages the upper face of the flange 35 on the ring 32.

As the air or other fluid continues to flow, into the bore 3, the ring 32 is forced upwardly thereagainst, and the said rings are held in lateral abutment while the operator places and secures the bolts in the flanges. When the flanges 35 and 36 have thus been securely connected, the valve 25 is closed and the valve 26 is opened. The table is thus lowered by the escape of the air from the cylinder 2 and the arms automatically moved inwardly. The tire shoe and the rim are then removed from the table.

If desired, the table 11 may be removed, the blocks 28 placed on the radially extending arms 10 and the ring 33 positioned on said blocks. When so used, the arms 10 will support the tire and the rim 31 is secured thereto in the same manner as is followed when the device is used with the table 11.

Having thus described my invention what I claim as new and desire to secure by Letters Patent is:—

1. In a device of the class described, a suitable base, a body extending upwardly therefrom, said body provided with a vertical bore, a piston operatively mounted in said bore, a piston shaft extending upwardly therefrom, a table mounted on said shaft, arms pivotally mounted on said body and extending upwardly through slots in said table, a claw extending outwardly from the free end of each arm, means to introduce fluid under pressure under said piston and automatic means to move the free ends of said arms outwardly in said slots as the piston is forced upwardly in said cylinder.

2. In a device of the class described, a suitable base, a cylindrical body extending upwardly therefrom, a bore in said body, a piston mounted in said bore, a shaft extending upwardly from said piston and beyond said body, a collar mounted on the upwardly extending end of said shaft, said collar provided with radially projecting horizontal arms, a table detachably secured upon said arms, said table provided with radially directed slots extending vertically therethrough, arms pivotally mounted on said body and extending upwardly through said slots, a claw extending outwardly from the free end of each arm, means to introduce fluid under pressure into said cylinder under said piston and force it to slide upwardly in said cylinder and means to automatically move the free end of said arms outwardly as the said table is moved upwardly by said piston.

3. A press for tire rim rings and the like including a table, means for elevating the table, oscillating arms extending from below to above the table, ring engaging means on the arms above the table, independent means urging each arm outward, and independent means drawing each arm inward when the table is lowered.

4. A press for tire rim rings and the like including a radial arm table, means for elevating the table, oscillating arms extending from below to above the table, ring engaging means on the arms above the table, independent means urging each oscillating arm outward, and independent means drawing each arm inward when the table is lowered.

5. A press for tire rim rings or the like including a table with radial slots therein, means for elevating the table, oscillating arms extending from below through the slots to above the table, ring engaging means on the arms above the table, independent means urging each arm outward, and independent means drawing each arm inward when the table is lowered.

6. A press for tire rim rings or the like including a table with radial slots therein, means for elevating the table, oscillating arms extending from below through the slots to above the table, ring engaging means on the arms above the table, yielding means urging each arm outward, and independent means drawing each arm inward when the table is lowered.

7. A press for tire rim rings or the like including a table, means for elevating the table, oscillating arms extending from below to above the table, ring engaging means on the arms above the table, counterweights urging each arm outward, an independent means drawing each arm inward when the table is lowered.

8. A press for tire rim rings and the like including a table, means for elevating the table, oscillating arms extending from below to above the table, ring engaging means on the arms above the table, independent means urging each arm outward and contractible connections between the upper end of each arm and the center of the table drawing the arms inward when the table is lowered.

In testimony whereof I have hereunto set my hand.

CARL G. ANDERSON.